US012746514B2

(12) United States Patent
Yamashita et al.

(10) Patent No.: US 12,746,514 B2
(45) Date of Patent: Sep. 29, 2026

(54) HOLLOW FIBER MEMBRANE MODULE

(71) Applicant: NOK CORPORATION, Tokyo (JP)

(72) Inventors: Matsuyoshi Yamashita, Shizuoka (JP); Yosuke Ito, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 369 days.

(21) Appl. No.: 18/565,872

(22) PCT Filed: May 11, 2022

(86) PCT No.: PCT/JP2022/019906
§ 371 (c)(1),
(2) Date: Nov. 30, 2023

(87) PCT Pub. No.: WO2022/255047
PCT Pub. Date: Dec. 8, 2022

(65) Prior Publication Data

US 2024/0335794 A1 Oct. 10, 2024

(30) Foreign Application Priority Data

Jun. 2, 2021 (JP) ................................ 2021-092956

(51) Int. Cl.
*B01D 63/00* (2006.01)
*B01D 63/02* (2006.01)
(Continued)

(52) U.S. Cl.
CPC ........ *B01D 63/02* (2013.01); *H01M 8/04149* (2013.01); *B01D 2313/04* (2013.01); *B01D 2313/083* (2013.01)

(58) Field of Classification Search
CPC .... B01D 63/02; B01D 63/00; B01D 2313/04; B01D 2313/083; B01D 2313/08;
(Continued)

(56) References Cited

U.S. PATENT DOCUMENTS 5,067,971 A * 11/1991 Bikson ................ B01D 63/021 95/52
2001/0015500 A1 8/2001 Shimanuki
2015/0364779 A1* 12/2015 Noh ................ H01M 8/04149 429/413

FOREIGN PATENT DOCUMENTS

JP 3048330 5/1998
JP 10-235160 9/1998
(Continued)

OTHER PUBLICATIONS

Japan, Notice of Reasons for Refusal received in Japanese Patent Application No. 2023-525689, dated Oct. 2, 2024.
(Continued)

*Primary Examiner* — Frank M Lawrence, Jr.
(74) *Attorney, Agent, or Firm* — GREENBLUM & BERNSTEIN, P.L.C.

(57) ABSTRACT

A hollow fiber membrane module includes: an inner case; an outer case that covers the inner case from an outer periphery side with a space left therebetween; at least one bypass pipe that connects to the inner case in the space between the inner case and the outer case; and a plurality of hollow fiber membranes that are provided in the space, the inner case including, on an upstream side, an introduction portion that establishes communication between inside and outside, the outer case including, on a downstream side, a discharge portion that establishes communication between the inside and the outside, the inner case including, on the downstream side, at least one bypass port that penetrates through the inner case between the inside and the outside, the bypass pipe communicating with the bypass port and being capable of forming a fluid path that connects the bypass port and the discharge portion.

6 Claims, 7 Drawing Sheets

1

(51) Int. Cl.
*H01M 8/04* (2016.01)
*H01M 8/04119* (2016.01)

(58) Field of Classification Search
CPC ............ B01D 2313/10; B01D 2313/12; B01D 69/08; H01M 8/04149; H01M 2008/1095; H01M 8/04; Y02E 60/50
USPC ........................................ 96/8, 10; 95/43–56
See application file for complete search history.

(56) References Cited

FOREIGN PATENT DOCUMENTS

| | | |
|---|---|---|
| JP | 2001-202978 | 7/2001 |
| JP | 2005-265196 | 9/2005 |
| JP | 2007-212076 | 8/2007 |
| JP | 2011-143347 | 7/2011 |

OTHER PUBLICATIONS

International Search Report issued in International Patent Application No. PCT/JP2022/019906, dated Jul. 19, 2022.
Written Opinion issued in International Patent Application No. PCT/JP2022/019906, dated Jul. 19, 2022.
International Preliminary Report on Patentability issued in International Patent Application No. PCT/JP2022/019906, dated Nov. 21, 2023.
Extended European search report issued in EP Application No. 22815802.8, dated Apr. 15, 2025.
Canadian Office Action received in CA Application No. 3,221,092, dated Dec. 2, 2024.
China, Office Action received in CN Application No. 202280037347.6, dated Nov. 13, 2025, and English language translation thereof.
Korean, Office Action received in KR application No. 10-2023-7040055, dated Jan. 30, 2026, and English language translation thereof.

* cited by examiner

50

HOLLOW FIBER MEMBRANE MODULE

CROSS REFERENCE TO RELATED APPLICATIONS

The present application claims the benefit of foreign priority to Japanese Patent Application No. 2021-092956, filed on Jun. 2, 2021, which is incorporated herein by reference in its entirety.

BACKGROUND

Technical Field

The present disclosure relates to a hollow fiber membrane module, and particularly relates to a hollow fiber membrane module used for a dehumidification/humidification device.

Description of the Related Art

A fuel cell is provided with a humidification device for humidifying an electrolyte membrane by humidifying reaction gas used for power generation therefor. For such a humidification device of the fuel cell, a hollow fiber membrane module including hollow fiber membranes is used in the related art. Such a hollow fiber membrane module includes an inner case with a tubular shape, an outer case that covers the inner case on an outer periphery side, and a plurality of hollow fiber membranes that extend along an annular space formed between the inner case and the outer case and is adapted such that gas flows from inside of the inner case to outside of the outer case through the annular space. In such a hollow fiber membrane module, reaction gas (off gas) containing moisture after being used for power generation flows inside the hollow fiber membrane module from the inside of the inner case to the outside of the outer case through the annular space, reaction gas before utilization flows inside the hollow fiber membrane, the humid off gas and the dry reaction gas thus contact each other via the hollow fiber membrane, the moisture in the humid off gas moves to a side of the dry reaction gas due to a membrane separation effect of the hollow fiber membrane, and the reaction gas is humidified (For example, see Japanese Patent Application Publication No. 2005-265196).

SUMMARY

A flow of the humid gas inside the hollow fiber membrane module as described above is related to humidification performance of such a hollow fiber membrane module, and it is possible to cause the humidification performance of the hollow fiber membrane module to be improved by the humid gas flowing without any stagnation inside the hollow fiber membrane module. Therefore, in order to improve the humidification performance of the hollow fiber membrane module, a configuration capable of curbing a pressure loss of gas flowing inside the hollow fiber membrane module is required in the related art.

The present disclosure relates to the aforementioned problem.

A hollow fiber membrane module according to the present disclosure includes: an inner case that is a member with a tubular shape; an outer case that is a member with a tubular shape covering the inner case from an outer periphery side with a space left therebetween; at least one bypass pipe that connects to the inner case in the space between the inner case and the outer case; and a plurality of hollow fiber membranes that are provided in the space between the inner case and the outer case, wherein the inner case includes an introduction portion that is a part establishing communication between inside of the inner case and outside of the inner case on a side of one end in an extending direction of the inner case and the outer case, the outer case includes a discharge portion that is a part establishing communication between inside of the outer case and outside of the outer case on a side of another end in the extending direction, the inner case includes at least one bypass port penetrating through the inner case between the inside of the inner case and the outside of the inner case on a side closer to the other end in the extending direction than the introduction portion, and the bypass pipe communicates with the bypass port and is capable of forming a fluid path that connects the bypass port and the discharge portion.

In the hollow fiber membrane module according to an aspect of the present disclosure, the bypass pipe connects to the outer case in the space between the inner case and the outer case, communicates with the discharge portion, and connects the bypass port and the discharge portion.

In the hollow fiber membrane module according to an aspect of the present disclosure, the bypass pipe extends to a vicinity of the discharge portion in the space between the inner case and the outer case.

In the hollow fiber membrane module according to an aspect of the present disclosure, the inner case includes one end portion with a tubular shape that is a part on the side of the one end and another end portion with a tubular shape that is a part on the side of the other end and connects to the one end portion on the side of the other end, the introduction portion is provided at the one end portion, the bypass port is provided at the other end portion, the one end portion has a diameter that decreases as it progresses from the one side to the other side in the extending direction, and the other end portion extends along the extending direction.

In the hollow fiber membrane module according to an aspect of the present disclosure, the bypass pipe extends along a direction perpendicularly intersecting the extending direction.

In the hollow fiber membrane module according to an aspect of the present disclosure, the introduction portion includes at least one large introduction port that penetrates through the inner case between the inside of the inner case and the outside of the inner case and includes at least one small introduction port that penetrates through the inner case between the inside of the inner case and the outside of the inner case, an opening area of the large introduction port is larger than an opening area of the small introduction port, and the large introduction port is provided on any side out of the one side and the other side in the extending direction with respect to the small introduction port.

The hollow fiber membrane module according to an aspect of the present disclosure includes: an inner case sealing portion that is a member tightly closing an opening of the inner case that opens the inside of the inner case on the other side.

The hollow fiber membrane module according to an aspect of the present disclosure includes: a one-end-side sealing portion that tightly closes an open portion that is opened on the one side of the space between the inner case and the outer case; and an other-end-side sealing portion that tightly closes an open portion that is opened on the other side of the space between the inner case and the outer case, wherein the plurality of hollow fiber membranes extend along the extending direction and penetrate through the one-end-side sealing portion and the other-end-side sealing portion.

According to one aspect of the hollow fiber membrane module of the present disclosure, it is possible to curb a pressure loss of gas flowing inside the hollow fiber membrane module.

DETAILED DESCRIPTION

Hereinafter, embodiments of the present disclosure will be described with reference to the drawings.

Figure 1:
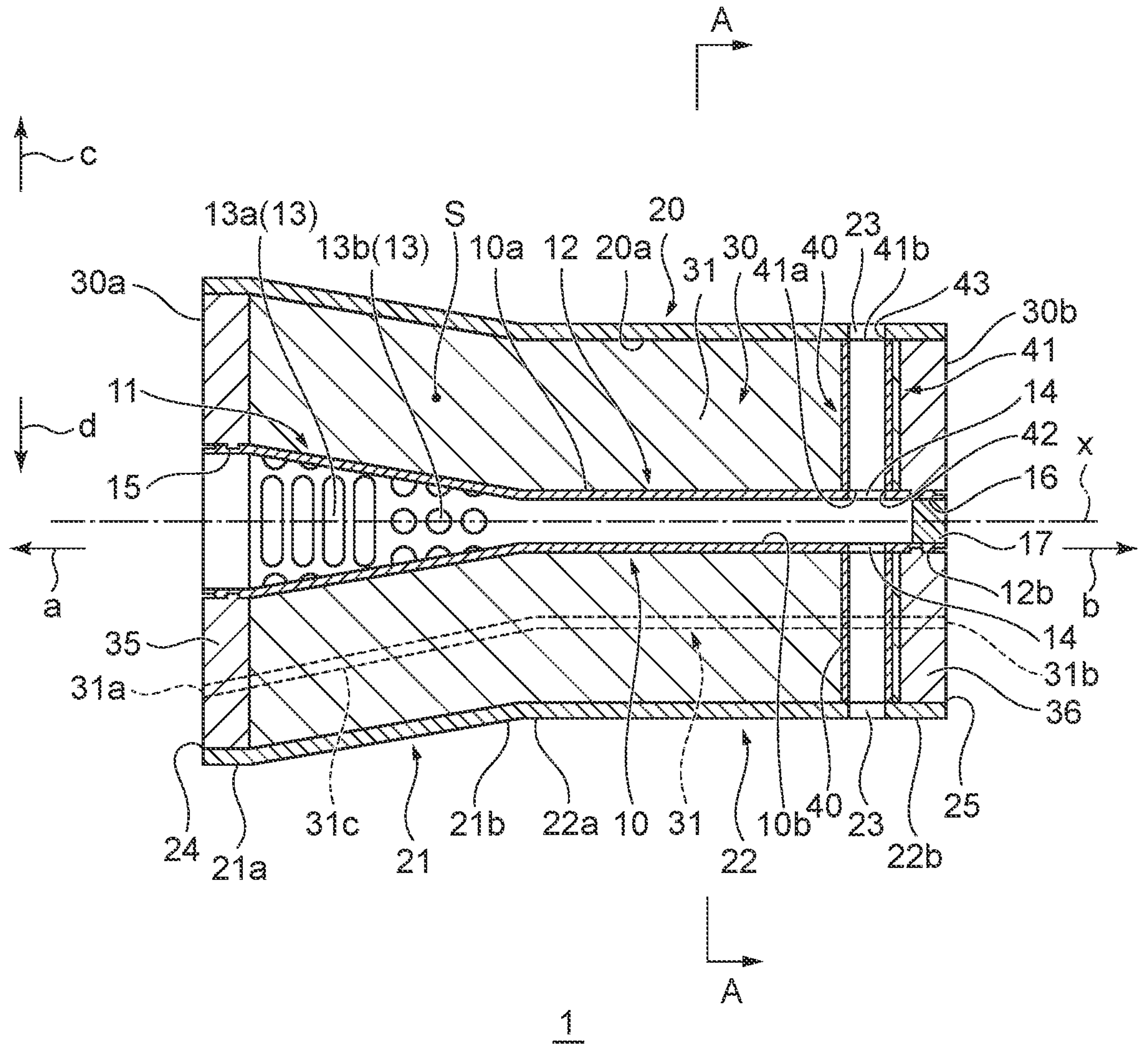
FIG. 1 A sectional view in a section along an extending direction illustrating an overview configuration of a hollow fiber membrane module according to an embodiment of the present disclosure.
Figure 2:
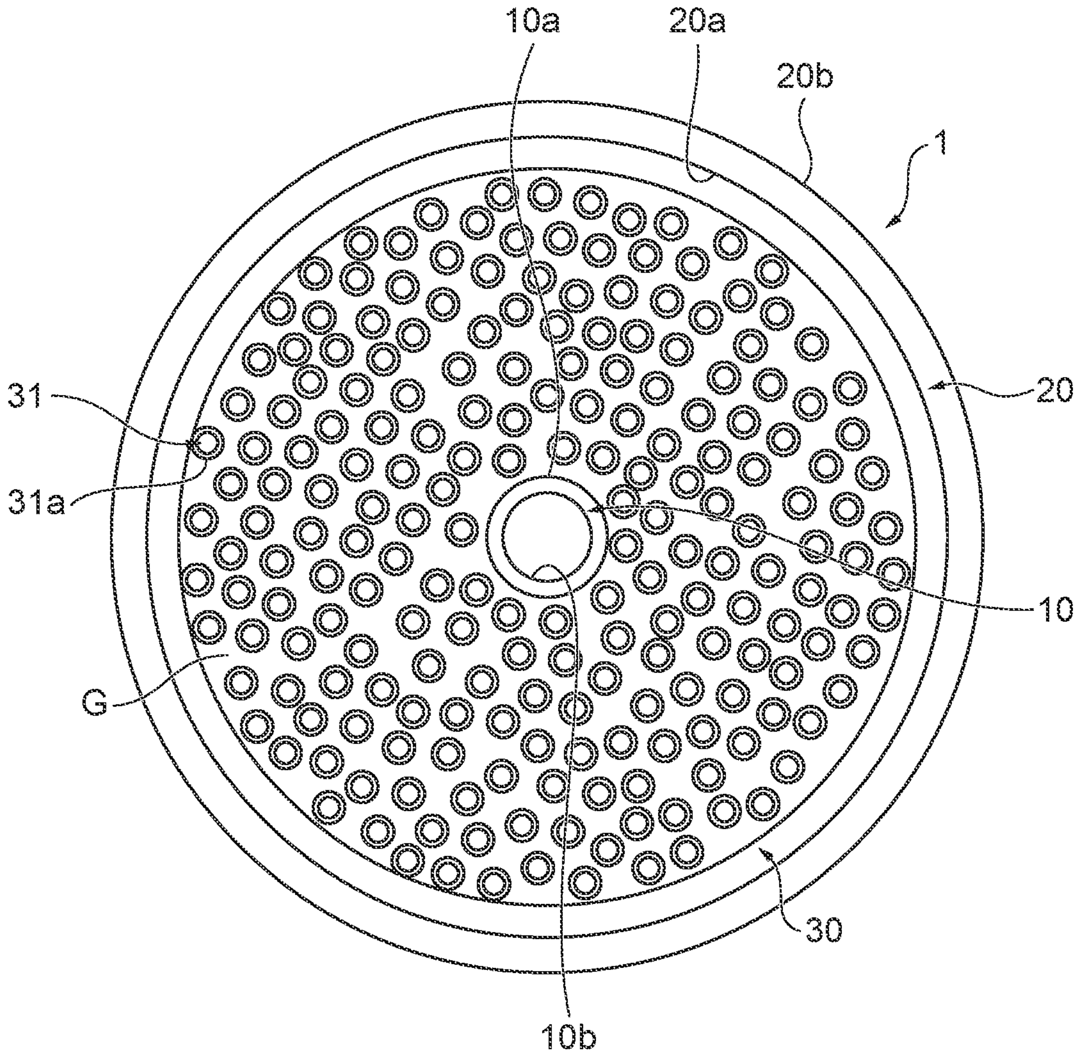
FIG. 2 A sectional view in a section intersecting the extending direction of the hollow fiber membrane module illustrated in FIG. 1.

FIG. 1 is a sectional view in a section along an extending direction (axis x) illustrating an overview configuration of a hollow fiber membrane module 1 according to an embodiment of the present disclosure. FIG. 2 is a sectional view in a section intersecting the extending direction of the hollow fiber membrane module 1 (A-A section). Hereinafter, in the axis x direction, an arrow a direction side will be defined as an upstream side, and an arrow b direction side will be defined as a downstream side. Also, in a direction perpendicular to the axis x (hereinafter, also referred to as a "radial direction"), a side of a direction separated from the axis x (an arrow c direction in FIG. 1) will be defined as an outer periphery side, and a side of a direction approaching the axis x (an arrow d direction in FIG. 1) will be defined as an inner periphery side.

The hollow fiber membrane module 1 according to the embodiment of the present disclosure is used as a dehumidification module or a humidification module of a dehumidification/humidification device. For example, the hollow fiber membrane module 1 is used as a humidification module of a humidification device for a fuel cell. Specifically, the hollow fiber membrane module 1 is used as a humidification module of a humidification device for humidifying an electrolyte membrane of a fuel cell. For example, reaction gas supplied for power generation is humidified by using reaction gas after used for power generation (off gas) which contains moisture generated by a chemical reaction for power generation and by utilizing a membrane separation effect of the hollow fiber membrane. The reaction gas to be supplied for power generation is fuel gas such as hydrogen and oxidant gas such as oxygen.

The hollow fiber membrane module 1 includes an inner case 10 that is a member with a tubular shape, an outer case 20 that is a member with a tubular shape covering the inner case 10 from an outer periphery side with a space (space S) left therebetween, at least one bypass pipe 40 that connects to the inner case 10 in the space S between the inner case 10 and the outer case 20, and a plurality of hollow fiber membranes 31 that are provided in the space S between the inner case 10 and the outer case 20 as illustrated in FIG. 1. The inner case 10 includes an introduction portion 13 that is a part establishing communication between inside of the inner case 10 and outside of the inner case 10 on a side of one (upstream side) end in an extending direction (axis x direction) of the inner case 10 and the outer case 20. The outer case 20 includes a discharge portion 23 that is a part establishing communication between inside of the outer case 20 and outside of the outer case 20 on a side of another (downstream side) end in the extending direction. The inner case 10 includes at least one bypass port 14 that penetrates through the inner case 10 between the inside of the inner case 10 and the outside of the inner case 10 on a side closer to the other end in the extending direction than the introduction portion 13. The bypass pipe 40 communicates with the bypass port 14 and can form a fluid path that connects the bypass port 14 and the discharge portion 23. Hereinafter, a configuration of the hollow fiber membrane module 1 according to the embodiment of the disclosure of the present application will be specifically described.

Figure 3:
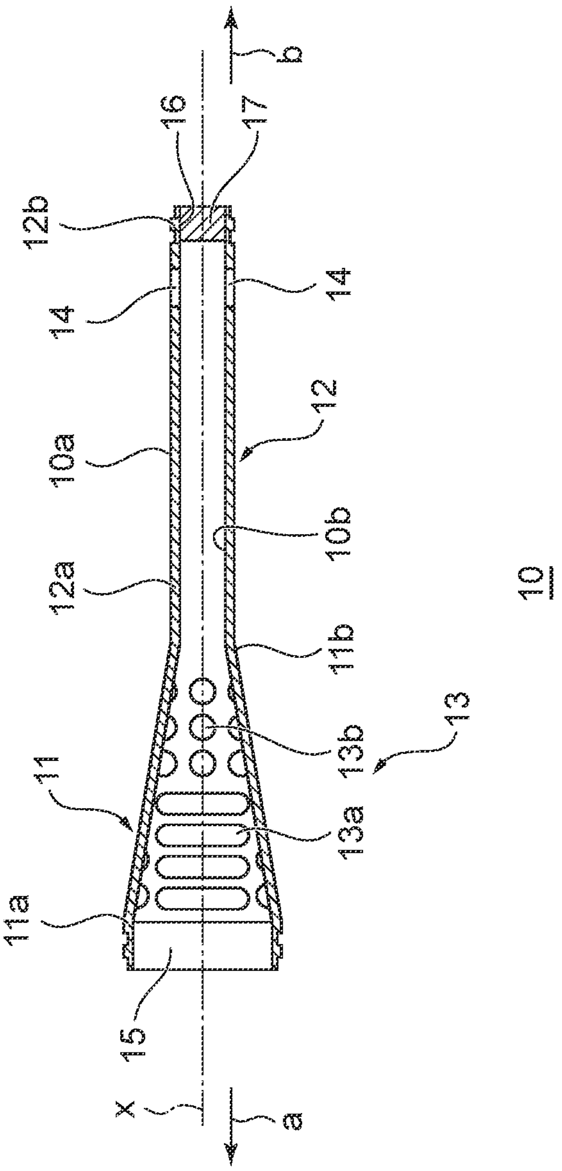
FIG. 3 A sectional view in a section along an extending direction of an inner case of the hollow fiber membrane module illustrated in FIG. 1.
Figure 4:
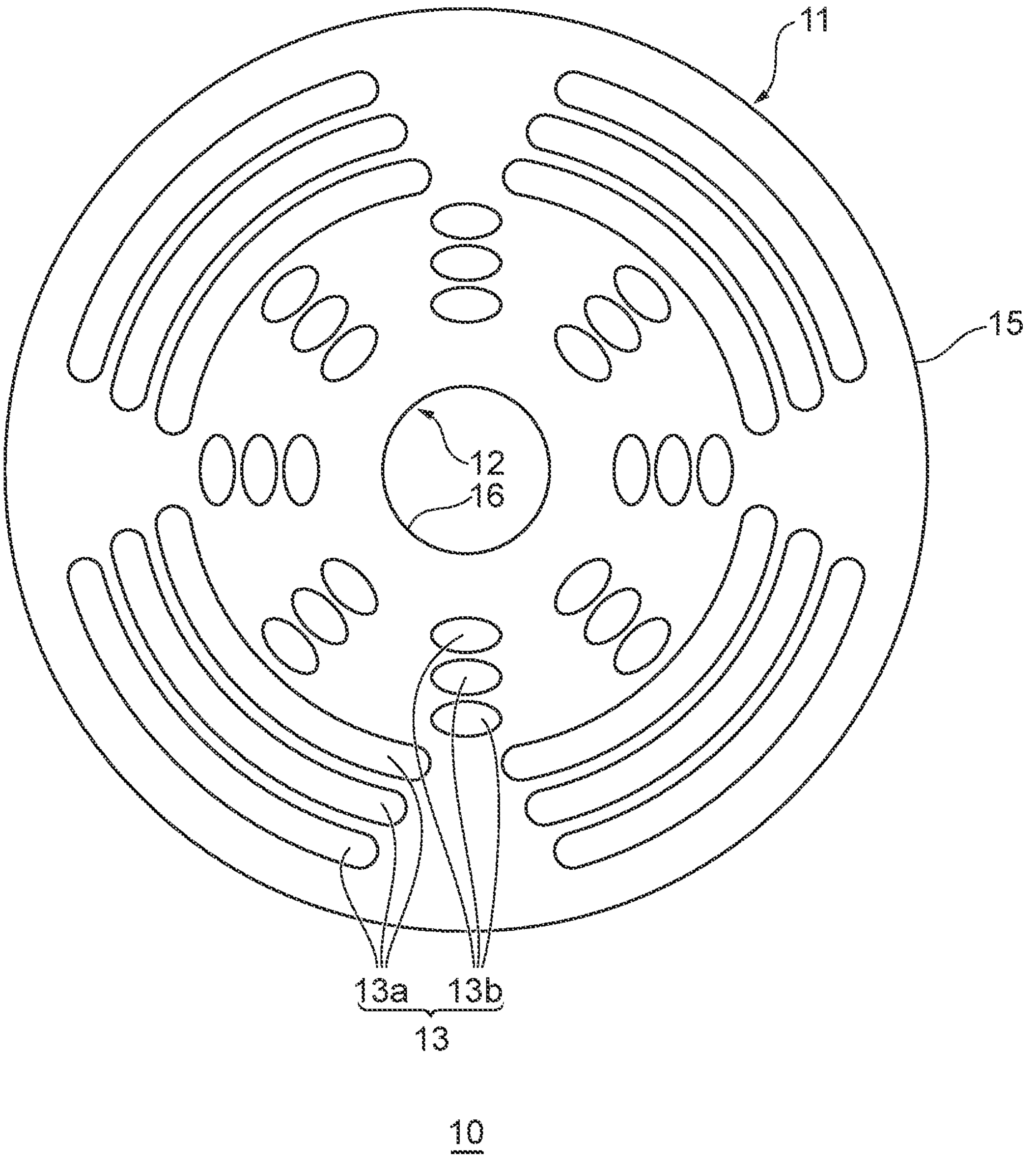
FIG. 4 A plan view of the inner case illustrated in FIG. 3.

FIG. 3 is a sectional view in a section along the extending direction (axis x) of the inner case 10, and FIG. 4 is a plan view of the inner case 10 and is a view of the inner case 10 seen from the upstream side. The inner case 10 is a member with a tubular shape as described above and is a member with a tubular shape extending along the axis x as illustrated in FIGS. 1 and 3, for example. Specifically, the inner case 10 includes an upstream main body portion 11 as one end portion with a tubular shape that is a part on the upstream side and a downstream main body portion 12 as another end portion with a tubular shape that is a part on the downstream side and connects to the upstream main body portion 11 on the downstream side, and the inner case 10 is shaped by the upstream main body portion 11 and the downstream main body portion 12.

The upstream main body portion 11 extends along the axis x, has a diameter that decreases as it progresses from the upstream side to the downstream side in the axis x direction, and has a truncated cone tubular or substantially truncated cone tubular shape that narrows toward the downstream side, for example. The upstream main body portion 11 is hollow, a space extends along the axis x inside the upstream main body portion 11, and the upstream main body portion 11 includes an opening 15 at an upstream end portion **11*a* that is an end portion on the upstream side. The opening 15 opens the internal space of the upstream main body portion 11 to outside of the upstream main body portion 11 toward the upstream side. In other words, the inside of the upstream main body portion 11 communicates with the outside via the opening 15. Also, a downstream end portion 11*b* that is an end portion of the upstream main body portion 11 on the downstream side connects to an upstream end portion 12*a* of the downstream main body portion 12, which will be described later, and the inside of the upstream main body portion 11 communicates with inside of the downstream main body portion 12**.

The downstream main body portion 12 extends along the axis x, has a constant or substantially constant width in the radial direction over the axis x direction, and has a cylindrical or substantially cylindrical shape extending along the axis x, for example. The downstream main body portion 12 is hollow, a space extends along the axis x inside the downstream main body portion 12, and the downstream main body portion 12 includes an opening 16 at the downstream end portion 12*b* that is an end portion on the downstream side. The opening 16 opens the inside of the downstream main body portion 12 to outside of the downstream main body portion 12 toward the downstream side. In other words, the inside of the downstream main body portion 12 communicates with the outside via the opening 16. Also, the upstream end portion 12*a* that is an end portion of the downstream main body portion 12 on the upstream side connects to the downstream end portion 11*b* of the upstream main body portion 11, and the inside of the downstream main body portion 12 communicates with the inside of the upstream main body portion 11, as described above.

The introduction portion 13 that establishes communication between the inside and the outside of the aforementioned inner case 10 is provided at the upstream main body portion 11. Specifically, the introduction portion 13 is provided on a side further downstream than the opening 15 at the upstream main body portion 11 as illustrated in FIG. 3, and the introduction portion 13 establishes communication between the inside of the inner case 10 and the inside of the outer case 20 (space S) in the hollow fiber membrane module 1. Additionally, the introduction portion 13 includes at least one large introduction port 13*a* that is an opening (through-hole) penetrating through the inner case 10 between the inside and the outside and includes at least one small introduction port 13*b* that is an opening (through-hole) penetrating through the inner case 10 between the inside and the outside as illustrated in FIGS. 1, 3, and 4, for example. An opening area of the large introduction port 13*a* is larger than an opening area of the small introduction port 13*b*. The opening area of each of the large introduction port 13*a* and the small introduction port 13*b* indicates a size of a surface in the space that each of the large introduction port 13*a* and the small introduction port 13*b* forms in the inner case 10 and, for example, is an area of a surface of the inner case 10 extending along an outer peripheral surface 10*a* or an inner peripheral surface 10*b* in each of regions of the large introduction port 13*a* and the small introduction port 13*b*. The large introduction port 13*a* is provided on any side out of the upstream side and the downstream side with respect to the small introduction port 13*b*.

Specifically, the introduction portion 13 includes a plurality of large introduction ports 13*a* aligned at equal angular intervals or substantially equal angular intervals in a circumferential direction at a same position or substantially a same position in the axis x direction as illustrated in FIGS. 3 and 4. Each large introduction port 13*a* extends along an arc and includes a part extending in the circumferential direction with a constant or substantially constant width in the axis x direction and parts forming end portions of curved surfaces at both ends thereof as illustrated in FIGS. 3 and 4, for example. The large introduction port 13*a* may have another shape. In addition, the introduction portion 13 includes a plurality of large introduction port 13*a* groups constituted by the plurality of large introduction ports 13*a* being aligned in the circumferential direction. As illustrated in FIGS. 3 and 4, for example, three large introduction port 13*a* groups are aligned at equal intervals or substantially equal intervals in the axis x direction in the inner case 10.

Also, specifically, the introduction portion 13 includes a plurality of small introduction ports 13*b* aligned at equal angular intervals or substantially equal angular intervals in the circumferential direction at a same position or substantially a same position in the axis x direction as illustrated in FIGS. 3 and 4. Each small introduction port 13*b* has an oval, substantially oval, or circular shape expanding in the circumferential direction as a shape when seen in the radial direction. The small introduction port 13*b* may extend along an arc and include a part extending in the circumferential direction with a constant or substantially constant width in the axis x direction and parts forming end portions of curved surfaces at both ends thereof, similarly to the large introduction port 13*a*. The small introduction port 13*b* may have another shape. Also, the introduction portion 13 includes a plurality of small introduction port 13*b* groups constituted by the plurality of small introduction ports 13*b* being aligned in the circumferential direction in this manner. As illustrated in FIGS. 3 and 4, for example, three small introduction port 13*b* groups are aligned at equal intervals or substantially equal intervals in the axis x direction in the inner case 10.

Also, the small introduction ports 13*b* are formed at a part on a side further downstream than a part of the inner case 10 where the large introduction ports 13*a* are formed in the axis x direction in the inner case 10 as illustrated in FIGS. 3 and 4. In the inner case 10, the small introduction ports 13*b* may be formed at a part on a side further upstream than the part of the inner case 10 where the large introduction ports 13*a* are formed in the axis x direction. Also, the part where the small introduction ports 13*b* are formed and the part where the large introduction ports 13*a* are formed may not be divided in the axis x direction in the inner case 10, and the large introduction ports 13*a* and the small introduction ports 13*b* may be present in a mixed manner in the introduction portion 13.

Note that the form of the introduction portion 13 is not limited to the aforementioned form. Although the introduction portion 13 is illustrated to be formed by the large introduction port 13*a* groups in three lines, in each of which the plurality of large introduction ports 13*a* are aligned in the circumferential direction, being aligned in the axis x direction and by the small introduction port 13*b* groups in three lines, in each of which the plurality of small introduction ports 13*b* are aligned in the circumferential direction, being aligned in the axis x direction, for example, the introduction portion 13 is not limited to one formed by the large introduction port 13*a* groups and the small introduction port 13*b* groups in three lines, respectively, and the introduction portion 13 may be one formed by the large introduction port 13*a* group and the small introduction port 13*b* group in one line, respectively, or by the large introduction port 13*a* groups and the small introduction port 13*b* groups in one line or a plurality of lines, respectively. Also, each large introduction port 13*a* group and each small introduction port 13*b* group may not be introduction port groups configured of the plurality of large introduction ports 13*a* and small introduction ports 13*b*, respectively, and may be configured of one large introduction port 13*a* and one small introduction port 13*b*. In addition, one of each large introduction port 13*a* group and each small introduction port 13*b* group may be configured of one large introduction port 13*a* or one small introduction port 13*b*, and another one of each large introduction port 13*a* group and each small introduction port 13*b* group may be configured of a plurality of large introduction ports 13*a* or a plurality of small introduction ports 13*b*. As the form, the introduction portion 13 can have various forms in accordance with utilization aspects of the hollow fiber membrane module 1.

The bypass port 14 penetrating through the aforementioned inner case 10 between the inside and the outside is provided at the downstream main body portion 12. Specifically, the bypass port 14 is provided at or in a vicinity of the downstream end portion 12*b* in the downstream main body portion 12 as illustrated in FIG. 3. Also, the bypass port 14 is provided at a position at least partially facing the discharge portion 23 of the outer case 20 in the radial direction. As illustrated in FIGS. 1 and 3, for example, the bypass port 14 is provided in the vicinity of the downstream end portion 12*b* on the upstream side and is provided at a position facing the discharge portion 23 of the outer case 20 in the radial direction or in a vicinity of the facing position. The position at which the bypass port 14 is provided in the downstream main body portion 12 of the inner case 10 is not limited thereto. Additionally, the bypass port 14 may be provided at the upstream main body portion 11 of the inner case 10 as long as it is on a side further downstream than the introduction portion 13.

The inner case 10 includes at least one bypass port 14, and as illustrated in FIGS. 1 and 3, the inner case 10 includes a plurality of bypass ports 14 aligned at equal angular intervals or substantially equal angular intervals in the circumferential direction at a same position or substantially a same position in the axis x direction. In the illustrated example, the inner case 10 includes two bypass ports 14 that face or substantially faces each other in the radial direction. Shapes of the bypass ports 14 seen from the radial direction are, for example, circular shapes or substantially circular shapes. The plurality of bypass ports 14 may have mutually the same shapes and sizes or may not have mutually the same shapes and sizes. In addition, the number of bypass ports 14 that the inner case 10 includes is not limited to the number illustrated in the drawings and may be one or three or more. Also, the plurality of bypass ports 14 may not be aligned at equal angular intervals in the circumferential direction, and may be aligned in another predetermined pattern, or may be irregularly aligned. Moreover, the plurality of bypass ports 14 may not be provided at the same position in the axis x direction, and for example, the plurality of bypass ports 14 may be arranged to depict a zigzag shape in the circumferential direction. In addition, the shapes of the bypass ports 14 are not limited to the circular shapes or substantially the circular shapes as described above and may be rectangular shapes or other shapes.

The inner case 10 is not limited to one including one bypass port group constituted by the plurality of bypass ports 14 being aligned in the circumferential direction as illustrated in the drawings, and a plurality of bypass port groups may be aligned in the axis x direction in the inner case 10. In this case, the inner case 10 may include the bypass ports 14 that have mutually the same shapes and sizes or may include the bypass ports 14 that do not have mutually the same shapes and sizes.

The inner case 10 has the aforementioned structure, the space is continuous with the inside of the inner case 10 along the axis x from the opening 15 on the upstream side to the opening 16 on the downstream side, and a member such as a wall part splitting the space inside the inner case 10 is not formed. Also, the space inside the inner case 10 communicates with the space S that is a space inside the outer case 20 via the large introduction ports 13*a* and the small introduction ports 13*b* of the introduction portion 13 formed at the upstream main body portion 11. Moreover, the space inside the inner case 10 communicates with inside of the bypass pipe 40 that communicates with the discharge portion 23 of the outer case 20, via the bypass ports 14 formed at the downstream main body portion 12. In this manner, the space inside the inner case 10 communicates with the space S inside the outer case 20 via the large introduction ports 13*a* and the small introduction ports 13*b* of the introduction portion 13 on the upstream side in the hollow fiber membrane module 1. Also, the space inside the inner case 10 communicates with the inside of the bypass pipe 40 that communicates with the discharge portion 23 of the outer case 20, via the bypass ports 14 on the side further downstream than the introduction portion 13, and the space inside the inner case 10 does not communicate with the space S inside the outer case 20 via the bypass ports 14, in the hollow fiber membrane module 1.

The form of the inner case 10 is not limited to the aforementioned form and may be another form. For example, the upstream main body portion 11 may not have a tapered shape and may have a cylindrical shape or substantially a cylindrical shape in the inner case 10 similarly to the downstream main body portion 12, and the inner case 10 may extend in a cylindrical shape or substantially a cylindrical shape along the axis x as a whole.

The outer case 20 is a member with a tubular shape extending in the extending direction as described above and is, for example, a member with a tubular shape extending along the axis x as illustrated in FIG. 1. Specifically, the outer case 20 has a form corresponding to the inner case 10, extends concentrically or substantially concentrically with the inner case 10 in regard to the axis x, and has a same or substantially a same length in the axis x direction as a length of the inner case 10 in the axis x direction. Specifically, the outer case 20 includes an upstream main body portion 21 with a tubular shape that is a part on the upstream side and a downstream main body portion 22 with a tubular shape that is a part on the downstream side and connects to the upstream main body portion 21 on the down stream side as illustrated in FIG. 1.

The upstream main body portion 21 extends along the axis x, has a diameter that decreases as it progresses from the upstream side to the downstream side in the axis x direction, and has a truncated cone tubular or substantially truncated cone tubular shape that narrows toward the downstream side, for example. The upstream main body portion 21 is hollow, a space extends along the axis x inside the upstream main body portion 21, and the upstream main body portion 21 includes an opening 24 at an upstream end portion 21*a* that is an end portion on the upstream side. The opening 24 opens the inside of the upstream main body portion 21 to the outside of the upstream main body portion 21 toward the upstream side. In other words, the inside of the upstream main body portion 21 communicates with the outside via the opening 24. Also, a downstream end portion 21*b* that is an end portion of the upstream main body portion 21 on the downstream side connects to an upstream end portion 22*a* of the downstream main body portion 22, which will be described later, and inside of the upstream main body portion 21 communicates with inside of the downstream main body portion 22.

The downstream main body portion 22 extends along the axis x, has a constant or substantially constant width in the radial direction over the axis x direction, and has a cylindrical or substantially cylindrical shape extending along the axis x, for example. The downstream main body portion 22 is hollow, a space extends along the axis x inside the downstream main body portion 22, and the downstream main body portion 22 includes an opening 25 at a downstream end portion 22*b* that is an end portion on the downstream side. The opening 25 opens the inside of the downstream main body portion 22 to the outside of the downstream main body portion 22 toward the downstream side. In other words, the inside of the downstream main body portion 22 communicates with the outside via the opening 25. Also, the upstream end portion 22*a* that is an end portion of the downstream main body portion 22 on the upstream side connects to the downstream end portion 21*b* of the upstream main body portion 21, and the inside of the downstream main body portion 22 communicates with the inside of the upstream main body portion 21, as described above.

A length of the upstream main body portion 21 of the outer case 20 in the axis x direction is the same or substantially the same as a length of the upstream main body portion 11 of the inner case 10 in the axis x direction, and a length of the downstream main body portion 22 of the outer case 20 in the axis x direction is the same or substantially the same as a length of the downstream main body portion 12 of the inner case 10 in the axis x direction. Therefore, the upstream end portion 21*a* of the upstream main body portion 21, the downstream end portion 21*b* of the upstream main body portion 21, the upstream end portion 22*a* of the downstream main body portion 22, and the downstream end portion 22*b* of the downstream main body portion 22 of the outer case 20 are located at the same or substantially the same positions as the positions of the upstream end portion 11*a* of the upstream main body portion 11, the downstream end portion 11*b* of the upstream main body portion 11, the upstream end portion 12*a* of the downstream main body portion 12, and the downstream end portion 12*b* of the downstream main body portion 12 of the inner case 10, respectively, in the axis x direction in the hollow fiber membrane module 1.

In addition, the outer case 20 has a form corresponding to the inner case 10, the upstream main body portion 21 of the outer case 20 extends in the axis x direction in parallel with or in substantially parallel with the upstream main body portion 11 of the inner case 10, and the downstream main body portion 22 of the outer case 20 extends in the axis x direction in parallel with or in substantially parallel with the downstream main body portion 12 of the inner case 10. Therefore, the space S with a hollow tubular shape and with an annular or donut-like sectional shape formed between the outer case 20 and the inner case 10 has a constant or substantially constant width in the radius direction over the width in the axis x direction in the hollow fiber membrane module 1.

The form of the outer case 20 is not limited to the aforementioned form and may be another form. For example, the upstream main body portion 21 may not have a tapered shape and may have a cylindrical shape or substantially a cylindrical shape in the outer case 20 similarly to the downstream main body portion 22, and the outer case 20 may extend in a cylindrical shape or substantially a cylindrical shape along the axis x as a whole. In addition, the upstream main body portion 21 of the outer case 20 may not extend in the axis x direction in parallel with the upstream main body portion 11 of the inner case 10, and the downstream main body portion 22 of the outer case 20 may not extend in the axis x direction in parallel with the downstream main body portion 12 of the inner case 10.

The discharge portion 23 that establishes communication between the inside and the outside of the aforementioned outer case 20 is provided at the downstream main body portion 22. Specifically, the discharge portion 23 is provided at or in a vicinity of the downstream end portion 22*b* in the downstream main body portion 22, and the discharge portion 23 is provided on a side further upstream than the opening 25, as illustrated in FIG. 1. The discharge portion 23 establishes communication between the inside (space S) of the outer case 20 and the outside of the outer case 20 in the hollow fiber membrane module 1. Also, the discharge portion 23 forms an opening extending in an endless annular strip shape around the axis x. As illustrated in FIG. 1, for example, the discharge portion 23 is provided at a position facing the bypass port 14 of the inner case 10 in the radial direction or in a vicinity of the facing position. The position at which the discharge portion 23 is provided in the downstream main body portion 22 of the outer case 20 is not limited thereto.

As described above, each of the bypass pipes 40 connects to the discharge portion 23, and the inside of each bypass pipe 40 communicates with the discharge portion 23. In this manner, the inside of the inner case 10 communicates with the outside of the outer case 20 via each bypass pipe 40 in the hollow fiber membrane module 1.

Figure 5:
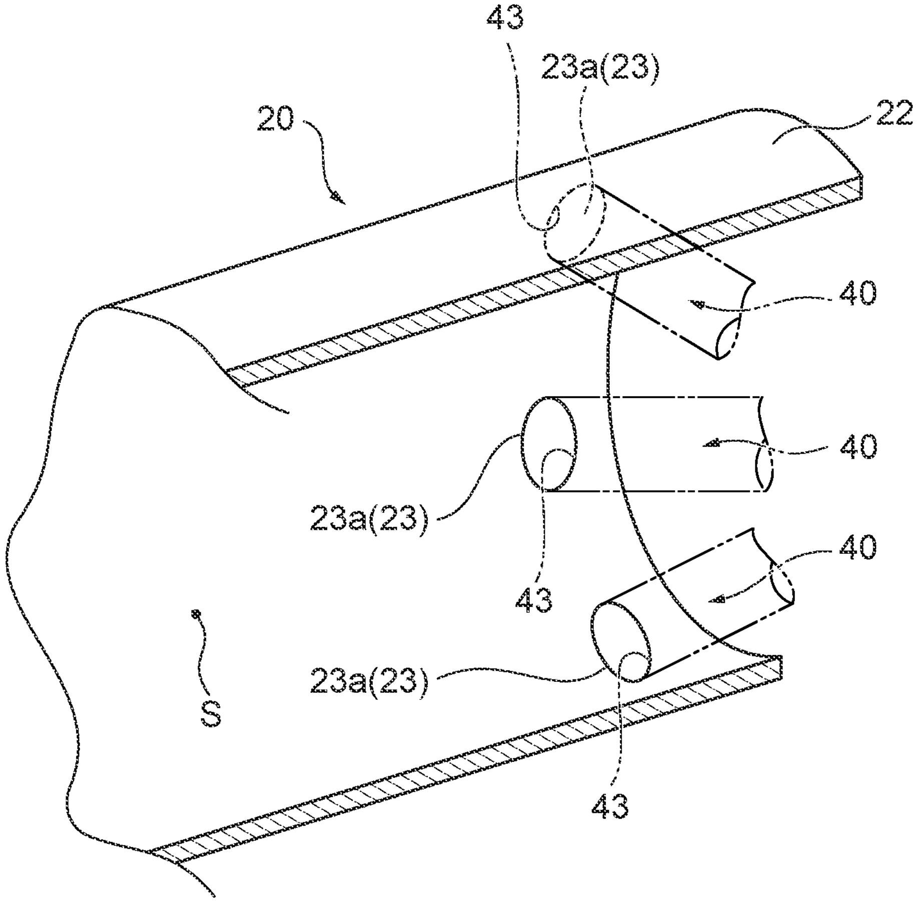
FIG. 5 A broken perspective view of an outer case illustrating a modification of a discharge portion that an outer case of the hollow fiber membrane module illustrated in FIG. 1 has.

The form of the discharge portion 23 is not limited to one in which the opening extending in the endless annular strip shape around the axis x is formed. As illustrated in FIG. 5, for example, the discharge portion 23 may be formed of one or a plurality of openings (discharge ports 23*a*) penetrating through the outer case 20 between the inside and the outside. In this case, the plurality of discharge ports 23*a* configuring the discharge portion 23 are aligned at equal angular intervals or substantially equal angular intervals in the circumferential direction at a same position or substantially a same position in the axis x direction, for example. Arrangement of the plurality of discharge ports 23*a* forming the discharge portion 23 may be other arrangement. Also, in the case where the discharge portion 23 is configured of one or a plurality of discharge ports 23*a*, the discharge ports 23*a* configuring the discharge portion 23 are provided in a number corresponding to the bypass pipes 40, and one bypass pipe 40 is connected to each discharge port 23*a* forming the discharge portion 23. Note that in the case where the discharge portion 23 is configured of one or a plurality of discharge ports 23*a*, the discharge ports 23*a* may not be provided in the number corresponding to the bypass pipes 40, and in this case, one or a plurality of bypass pipes 40 may be connected to each discharge port 23, and there may be discharge ports 23*a* to which the bypass pipes 40 are not connected.

As described above, the plurality of hollow fiber membranes 31 are provided in the space S between the inner case 10 and the outer case 20. Specifically, the space S is filled with a hollow fiber membrane bundle 30 that is a bundle of hollow fiber membranes 31. The hollow fiber membrane bundle 30 has a tubular shape as illustrated in FIGS. 1 and 2, for example. In the hollow fiber membrane bundle 30, each hollow fiber membrane 31 extends along the axis x direction, an opening (upstream opening 31*a*) on one end side (upstream side) of each hollow fiber membrane 31 is located at an upstream end 30*a* that is an end of the hollow fiber membrane bundle 30 facing the upstream side, and an opening (downstream opening 31*b*) on another end side (downstream side) of each hollow fiber membrane 31 is located at a downstream end 30*b* that is an end of the hollow fiber membrane bundle 30 facing the downstream side. The hollow fiber membrane bundle 30 has a shape in which the hollow fiber membranes 31 forming a boundary on the inner periphery side extend along the outer peripheral surface 10*a* of the inner case 10, the hollow fiber membranes 31 forming a boundary on the outer periphery side extend along an inner peripheral surface 20*a* of the outer case 20, and the hollow fiber membrane bundle 30 follows the outer peripheral surface 10*a* of the inner case 10 and the inner peripheral surface 20*a* of the outer case 20, as illustrated in FIG. 1, for example. The shape of the hollow fiber membrane bundle 30 is not limited to the shape following the outer peripheral surface 10*a* of the inner case 10 and the inner peripheral surface 20*a* of the outer case 20 in this manner and may be another shape. For example, the hollow fiber membrane bundle 30 may have a cylindrical or substantially cylindrical shape extending along the axis x or may have a conical tubular or substantially conical tubular shape extending along the axis x.

In the hollow fiber membrane bundle 30, clearances through which fluid can pass are formed between mutually adjacent hollow fiber membranes 31 as illustrated in FIG. 2. Also, clearances through which liquid or gas can pass are preferably formed between the hollow fiber membranes 31 forming the boundary of the hollow fiber membrane bundle 30 on the inner periphery side and the outer peripheral surface 10*a* of the inner case 10, and clearances through which liquid or gas can pass are preferably formed between the hollow fiber membranes 31 forming the boundary of the hollow fiber membrane bundle 30 on the outer periphery side and the inner peripheral surface 20*a* of the outer case 20. Note that although clearances through which fluid can pass are preferably formed over the entirety in the axis x direction between the mutually adjacent hollow fiber membranes 31, the clearances through which fluid can pass may not be formed over the entirety in the axis x direction.

The hollow fiber membranes 31 are adapted to have a membrane separation effect of causing moisture in humid gas to move to a side of dry gas between the inside and the outside of the hollow fiber membranes 31 and are created into hollow pipe shapes. As a material of the hollow fiber membranes 31, it is possible to suitably use polyphenylsulfone (PPSU) that has a property of transmitting moisture by a capillary condensation mechanism based on pore diameter control, for example. Note that it is possible to obtain hollow fiber membranes with hydrophilicity by performing spinning by using a film forming solution to which PPSU and a hydrophilic polymer (polyvinylpyrrolidone) are added. Also, it is possible to use a polymer (such as Nafion (registered trademark)) having a property of transmitting moisture through dissolution diffusion and including a polytetrafluoroethylene skeleton and a perfluoro side chain having a sulfo group as a material of the hollow fiber membranes 31.

Also, as illustrated in FIG. 1, the hollow fiber membrane module 1 includes sealing portions 35 and 36 (a one-end-side sealing portion and an other-end-side sealing portion) for achieving tight closure of openings that open the spaces S formed by each of the openings 24 and 25 of the outer case 20 to the outside of the hollow fiber membrane module 1. Specifically, the sealing portion 35 is provided at the opening 24 of the outer case 20 on the upstream side, is in contact with the inner peripheral surface 20*a* of the outer case 20 over the entire periphery at the opening 24 of the outer case 20, and is in contact with the outer peripheral surface 10*a* of the inner case 10 over the entire periphery at the opening 24 of the outer case 20. Also, the sealing portion 35 is in contact with an outer peripheral surface 31*c* of each hollow fiber membrane 31 over the entire periphery at the opening 24 of the outer case 20. Moreover, each hollow fiber membrane 31 penetrates through the sealing portion 35 at an end portion on the upstream side, and the upstream opening 31*a* of each hollow fiber membrane 31 opens the inside of the hollow fiber membrane 31 to a space outside the sealing portion 35. Specifically, the sealing portion 36 is similarly provided at the opening 25 of the outer case 20 on the downstream side, is in contact with the inner peripheral surface 20*a* of the outer case 20 over the entire periphery at the opening 25 of the outer case 20, and is in contact with the outer peripheral surface 10*a* of the inner case 10 over the entire periphery at the opening 25 of the outer case 20. Additionally, the sealing portion 36 is in contact with the outer peripheral surface 31*c* of each hollow fiber membrane 31 over the entire periphery at the opening 25 of the outer case 20. Moreover, each hollow fiber membrane 31 penetrates through the sealing portion 36 at an end portion on the downstream side, and the downstream opening 31*b* of each hollow fiber membrane 31 opens the inside of the hollow fiber membrane 31 to the space outside the sealing portion 36.

In this manner, tight sealing of the opening (opening 24) that opens the space S on the upstream side is achieved by the sealing portion 35, tight sealing of the opening (opening 25) that opens the space S on the downstream side is achieved by the sealing portion 36, and on the other hand, the space inside each hollow fiber membrane 31 is opened to the outside of the hollow fiber membrane module 1 via the upstream opening 31*a* and the downstream opening 31*b*. In addition, each hollow fiber membrane 31 is fixed to the inner case 10 and to the outer case 20 with the sealing portions 35 and 36, respectively, at the end portions on the upstream side and the downstream side. The hollow fiber membranes 31 are fixed into a bundle shape, and the hollow fiber membrane bundle 30 is thus formed, through the fixation of the hollow fiber membranes 31 with the sealing portions 35 and 36. The sealing portions 35 and 36 are members formed by a potting material, such as an epoxy resin, for example, being cured.

Also, the hollow fiber membrane module 1 includes a sealing portion 17 (inner case sealing portion) that achieves tight closure of the opening 16 at the downstream end portion 12*b* of the inner case 10 as illustrated in FIGS. 1 and 3. The sealing portion 17 is in contact with the inner peripheral surface 10*b* of the inner case 10 over the entire periphery at the opening 16 of the inner case 10. The sealing portion 17 is a member formed by a potting material, such as an epoxy resin, for example, being cured. The sealing portion 17 is located on a side further downstream than the bypass ports 14 in the inner case 10.

Also, the hollow fiber membrane module 1 includes at least one bypass pipe 40 as described above. The bypass pipe 40 is a member with a hollow pipe shape and is a member with a tubular shape extending along a straight line, for example. The bypass pipe 40 is a member with a cylindrical shape or substantially a cylindrical shape, for example. The bypass pipe 40 may be a member with a tubular shape extending along a curved line or may be a member with a tubular shape extending along a line constituted by a combination of a straight line and a curved line. Also, the bypass pipe 40 may be a member with a polygonal tubular shape or substantially a polygonal tubular shape.

As illustrated in FIG. 1, the bypass pipe 40 includes a main body portion 41 extending in a tubular shape, an opening 42 that opens the inside of the bypass pipe 40 to the outside at one end (end 41*a*) of the main body portion 41, and an opening 43 that opens the inside of the bypass pipe 40 to the outside at another end (end 41*b*) of the main body portion 41.

The bypass pipe 40 has the end 41*a* connecting to the inner case 10 and the opening 42 communicating with the bypass port 14 of the inner case 10. Also, the bypass pipe 40 has the end 41*b* connecting to the outer case 20 and the opening 43 communicating with the discharge portion 23 of the outer case 20. In the case where the discharge portion is constituted by the discharge port 23*a* as illustrated in FIG. 5, the opening 43 of the bypass pipe 40 communicates with the discharge port 23*a* of the outer case 20. Although the bypass pipe 40 penetrates through the hollow fiber membrane bundle 30, the bypass pipe 40 does not split each hollow fiber membrane 31 and extends between the mutually adjacent hollow fiber membranes 31.

The bypass 40 is formed integrally with the inner case 10 from a same material and is connected to the outer case 20 at the end 41*b*. The bypass pipe 40 may be formed as a member separated from the inner case 10 and the outer case 20, the bypass pipe 40 may be formed integrally with the outer case 20 from a same material and is connected to the inner case 10 at the end 41*a*, or the bypass pipe 40 may be formed integrally with the inner case 10 and the outer case 20 from a same material. Connection between the bypass pipe 40 and each of the inner case 10 and the outer case 20 and connection with the outer case 20 or the inner case 10 are preferably connection by which close contact can be achieved, such as adhesion or pressure welding. Also, the connection of the bypass pipe 40 to the inner case 10 and the outer case 20 and the connection with the outer case 20 or the inner case 10 may be constituted via a sealing member such as an O ring. The bypass pipe 40 is resin-molded from a resin material such as polyphenylene sulfide (PPS), polyphthalamide (PPA), or polyphenylene oxide (PPO), for example. These resin materials may be reinforced with glass fibers or the like. Also, the material of the bypass pipe 40 may be a metal material such as aluminum.

The hollow fiber membrane module 1 has the configuration as described above and includes two fluid paths communicating with the outside. One is a first fluid path F1, which is a fluid path formed by each hollow fiber membrane 31, and is a fluid path formed by the upstream opening 31*a*, the inside of the hollow fiber membrane 31, and the downstream opening 31*b*. Another one is a second fluid path F2, which is a fluid path extending between the opening 15 of the inner case 10 on the upstream side and the discharge portion 23 of the outer case 20 and is formed by the opening 15 of the inner case 10, the internal space of the inner case 10, the introduction portion 13 of the inner case 10, a space G between the mutually adjacent hollow fiber membranes 31 in the space S, and the discharge portion 23 of the outer case 20.

The bypass port 14 is provided at the inner case 10 of the hollow fiber membrane module 1 on the downstream side, the bypass port 14 communicates with the bypass pipe 40 communicating with the discharge portion 23 of the outer case 20, and the inside of the inner case 10 and the outside of the outer case 20 communicate with each other via the bypass pipe 40. Therefore, the hollow fiber membrane module 1 includes a third fluid path F3 formed by the inside of the inner case 10, the bypass port 14 of the inner case 10, the inside of the bypass pipe 40, and the discharge portion 23 of the outer case 20.

Figure 6:
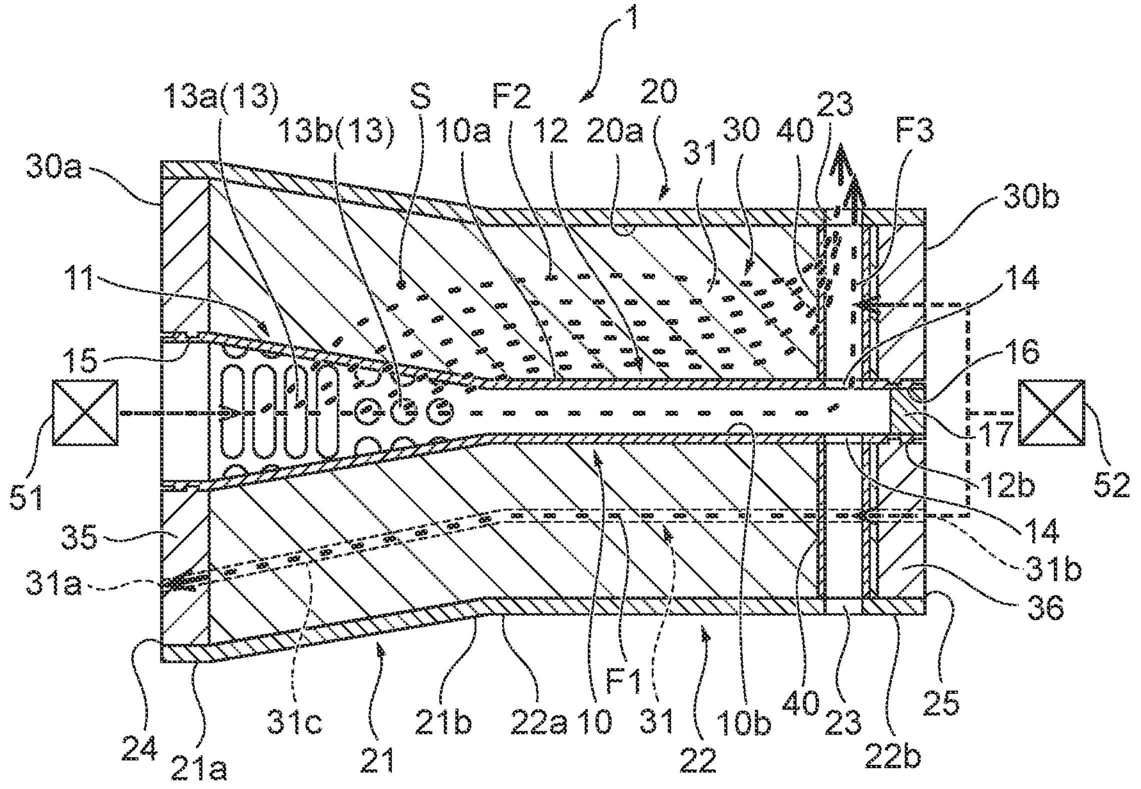
FIG. 6 A view for explaining effects of the hollow fiber membrane module according to the embodiment of the present disclosure and illustrating an overview configuration of a humidification device that includes the hollow fiber membrane module according to the embodiment of the present disclosure.

Next, effects of the hollow fiber membrane module 1 with the configuration as described above will be described. FIG. 6 is a view for explaining effects of the hollow fiber membrane module 1, and the hollow fiber membrane module 1 in a usage state is illustrated in a section. In FIG. 6, the first, second, and third fluid paths F1, F2, and F3 are schematically illustrated.

As described above, the hollow fiber membrane module 1 is used as a dehumidification module or a humidification module of a dehumidification/humidification device. In the illustrated example, the hollow fiber membrane module 1 is used as a humidification module of a humidification device for a fuel cell and is in a usage state of being attached to a humidification device 50 for a fuel cell.

As illustrated in FIG. 6, the humidification device 50 includes the hollow fiber membrane module 1, a humid gas supply device 51, and a dry gas supply device 52. The humid gas supply device 51 is adapted to supply humid gas to the second fluid path F2 of the hollow fiber membrane module 1. In addition, the dry gas supply device 52 is adapted to supply dry gas, which has a lower humidity than the humid gas to be supplied from the humid gas supply device 51, to the first fluid path F1 formed by each hollow fiber membrane 31. The humid gas that the humid gas supply device 51 supplies is off gas after reaction gas supplied for power generation in the fuel cell causes a chemical reaction, and the dry gas that the dry gas supply device 52 supplies is reaction gas to be supplied for power generation. In the present embodiment, the dry gas to be supplied from the dry gas supply device 52 is oxidant gas such as oxygen in the reaction gas, and the humid gas is oxidant off gas in the off gas after the oxidant gas such as oxygen is used for power generation.

Once the humidification device 50 is activated, the humid gas is supplied from the humid gas supply device 51 to the second fluid path F2 of the hollow fiber membrane module 1, and the dry gas is supplied from the dry gas supply device 52 to the first fluid path F1 of the hollow fiber membrane module 1. In this manner, the dry gas flows inside each hollow fiber membrane 31, the humid gas flows in the space G between the mutually adjacent hollow fiber membranes 31 in the space S, and the dry gas and the humid gas contact with each other via the hollow fiber membranes 31. At this time, moisture in the humid gas moves to a side of the dry gas by the membrane separation effect of the hollow fiber membranes 31. In this manner, the dry gas flowing through the first fluid path F1 is humidified, is discharged from the upstream opening 31*a* of each hollow fiber membrane 31, and is discharged from the hollow fiber membrane module 1. The humidified dry gas (oxidant gas) is supplied as reaction gas for the fuel cell to an electrolyte membrane of the fuel cell. In this manner, the electrolyte membrane of the fuel cell is humidified. On the other hand, the humid gas that has humidified the dry gas is discharged from the hollow fiber membrane module 1.

The hollow fiber membrane module 1 has the configuration as described above and includes two fluid paths communicating with the outside. One is the first fluid path F1 formed by each hollow fiber membrane 31, which is a fluid path formed by the upstream opening 31*a*, the inside of the hollow fiber membrane 31, and the downstream opening 31*b*. The other is the second fluid path F2, which is a fluid path extending between the opening 15 of the inner case 10 on the upstream side and the discharge portion 23 of the outer case 20 and is formed by the opening 15 of the inner case 10, the internal space of the inner case 10, the introduction portion 13 of the inner case 10, the space G between the mutually adjacent hollow fiber membranes 31 in the space S, and the discharge portion 23 of the outer case 20.

Specifically, the humid gas to be supplied from the humid gas supply device 51 enters the inside of the inner case 10 from the opening 15 of the inner case 10 on the upstream side and advances to the downstream side inside the inner case 10. Then, a part of the humid gas advancing to the downstream side inside the inner case 10 flows to the space S via each of the large introduction ports 13*a* and the small introduction ports 13*b* of the introduction portion 13. The humid gas that has flowed into the space S from the introduction portion 13 flows through the space G between the mutually adjacent hollow fiber membranes 31 in the space S, contacts with the hollow fiber membranes 31, humidifies the dry air flowing inside the hollow fiber membranes 31 by the membrane separation effect of the hollow fiber membranes 31, is discharged from the space S via the discharge portion 23 of the outer case 20, and is discharged from the hollow fiber membrane module 1.

The upstream main body portion 11 of the inner case 10 has a diameter further that decreases as it progresses from the upstream side to the downstream side, and the large introduction ports 13*a* and the small introduction ports 13*b* are formed in the upstream main body portion 11. Therefore, the gas flowing out from the large introduction ports 13*a* and the small introduction ports 13*b* to the space S tends to flow out in a direction inclined with respect to the axis x. In this manner, the humid gas that has flowed out to the space S from the large introduction ports 13*a* and the small introduction ports 13*b* is likely to flow in the direction inclined with respect to the axis x in the space G between the mutually adjacent hollow fiber membranes 31 in the space S, and the humid gas is likely to flow while facing the dry gas passing through the inside of the hollow fiber membranes 31.

In addition, the opening area of the large introduction ports 13*a* provided on the upstream side is larger than the opening area of the small introduction ports 13*b* provided on the downstream side in the introduction portion 13. Therefore, it is possible to set a larger flow amount of gas flowing out to the space S from the large introduction ports 13*a* on the upstream side with the larger opening area than a flow amount of gas flowing out to the space S from the small introduction ports 13*b* on the downstream side with the smaller opening area. In this manner, it is possible to adjust the flow amount of gas flowing out to the space S depending on a position in the introduction portion 13 and thereby to adjust the flow amount of gas flowing through the space G between the mutually adjacent hollow fiber membranes 31 depending on the position in the space S. In the hollow fiber membrane module 1, the flow amount of gas flowing out to the space S from the part of the introduction portion 13 on the upstream side is large as described above, and it is possible to allow the gas to flow into the space S on a side closer to the outer periphery side and thereby to achieve an increase in flow amount of the gas flowing through the space G on the outer periphery side in the space S. On the other hand, the flow amount of the gas flowing out to the space S from the part of the introduction portion 13 on the downstream side is smaller than the flow amount of the gas flowing out to the space S from the part on the upstream side as described above, and it is possible to keep a balance between the flow amount of the gas flowing in the space G on the inner periphery side in the space S and the flow amount of the gas that has reached the space G on the side closer to the outer periphery side in the space S and is flowing there. Also, the gas flowing out to the space S from the introduction portion 13 can have a trend that the gas flows out in the direction inclined with respect to the axis x from the difference in the flow amounts of the gas flowing out from the introduction portion 13 on the upstream side and the downstream side.

Additionally, the humid gas flows into a region on the inner periphery side and on the upstream side of the space S via the introduction portion 13 and is discharged from a region on the outer periphery side and on the downstream side of the space S via the discharge portion 23. Therefore, the humid gas flowing into the inside of the space S can contact with the entire hollow fiber membranes 31 of the hollow fiber membrane bundle 30, and the entire hollow fiber membranes 31 of the hollow fiber membrane bundle 30 can exhibit the membrane separation effect.

In this manner, the hollow fiber membrane module 1 is devised such that the humid gas that has flows out to the space S from the introduction portion 13 is likely to flow while facing the dry gas passing through the inside of the hollow fiber membranes 31, the humid gas is likely to contact with the entire hollow fiber membranes 31 in the hollow fiber membrane bundle 30, and the entire hollow fiber membranes 31 of the hollow fiber membrane bundle 30 exhibit the membrane separation effect. Therefore, the membrane separation effect of the hollow fiber membrane bundle 30 is efficiently executed, and high humidification performance is obtained, in the hollow fiber membrane module 1.

On the other hand, specifically, the dry gas supplied from the dry gas supply device 52 enters the inside of the hollow fiber membranes 31 from the downstream opening 31*b* of each hollow fiber membrane 31 and advances to the upstream side inside the hollow fiber membranes 31. Then, the dry gas advancing to the upstream side inside the hollow fiber membranes 31 is humidified by the humid air that contacts with the hollow fiber membranes 31 due to the membrane separation effect of the hollow fiber membranes 31, is discharged from the upstream opening 31*a* of the hollow fiber membrane 31, and is discharged from the hollow fiber membrane module 1.

Also, a part of the humid gas supplied from the humid gas supply device 51 and advancing to the downstream side inside the inner case 10 flows into the third fluid path F3. Specifically, a part of the humid gas supplied from the humid gas supply device 51 and advancing to the downstream side inside the inner case 10 continuously advances to the downstream side inside the inner case 10 without flowing out to the space S from the introduction portion 13. The part of the humid gas continuously flowing to the downstream side inside the inner case 10 flows into the inside of the bypass pipe 40 via the bypass port 14 formed on the side further downstream than the introduction portion 13 in the inner case 10. The humid gas flowing out to the inside of the bypass pipe 40 from the bypass port 14 flows through the space G between the mutually adjacent hollow fiber membranes 31 in the space S like the humid gas flowing through the second fluid path F2, passes through the inside of the bypass pipe 40 and is discharged from the discharge portion 23 of the outer case 20 without contacting with the hollow fiber membranes 31, and is discharged from the hollow fiber membrane module 1.

As described above, the humid gas that has not flowed out to the space S from the introduction portion 13 in the humid gas supplied to the inner case 10 continuously advances to the downstream side inside the inner case 10 and is discharged to the outside of the hollow fiber membrane module 1 from the discharge portion 23 via the bypass port 14 and the bypass pipe 40. Therefore, stagnation of the humid gas on the side further downstream than the introduction portion 13 inside the inner case 10 is curbed, and it is possible to reduce and adjust the amount of humid gas flowing out to the space S from the introduction portion 13 in the humid gas supplied to the inner case 10.

If the amount of humid gas flowing out to the space S from the introduction portion 13 of the inner case 10 increases, excess humid gas flows into the space G between the mutually adjacent hollow fiber membranes 31 in the space S, it becomes difficult for the humid gas to flow through the space G between the hollow fiber membranes 31, a pressure loss occurs in the humid gas flowing through the space G, and a dynamic pressure of the humid gas decreases. Once the dynamic pressure of the humid gas flowing through the space G decreases, the humid gas flowing through the second fluid path F2 on the downstream side of the space S stagnates. On the contrary, the hollow fiber membrane module 1 can reduce the amount of humid gas flowing out to the space S from the introduction portion 13 in the humid gas supplied to the inner case 10 by causing the humid gas to flow through the third fluid path F3 formed by the bypass port 14 and the bypass pipe 40 as described above. In this manner, it is possible to curb the amount of humid gas flowing through the second fluid path F2 from becoming excessive, and a decrease in dynamic pressure of the humid gas flowing through the second fluid path F2 in the space G between the mutually adjacent hollow fiber membranes 31 in the space S is curbed. In this manner, it is possible to cause a pressure loss of the humid gas flowing through the space G between the mutually adjacent hollow fiber membranes 31 in the space S to be reduced and to curb the humid gas flowing through the second fluid path F2 from stagnating. Therefore, it is possible to improve the membrane separation effect of the hollow fiber membranes 31 for the humid gas in the second fluid path F2 and to improve efficiency of humidifying the dry air.

Also, the downstream main body portion is continuous with the upstream main body portion 11 with a tapered shape from the side of the small diameter of the upstream main body portion 11 and has a constant or substantially constant diameter in the inner case 10. Therefore, it is easy to secure a space on the outer periphery side of the downstream main body portion 12 and to increase the part of the downstream main body portion 12 on the outer periphery side in size in the space S. In this manner, it is possible to curb a filling rate of the space S with the hollow fiber membranes 31 from increasing and to curb a pressure loss of a fluid in a region of the space S on the outer periphery side of the downstream main body portion 12. Therefore, it is possible to curb a pressure loss of the humid gas flowing through the second fluid path F2 and to curb the humid gas flowing through the second fluid path F2 from stagnating on the downstream side of the space S.

In this manner, according to the hollow fiber membrane module 1 of the embodiment of the present disclosure, it is possible to curb a pressure loss of gas flowing inside the hollow fiber membrane module 1. It is thus possible to achieve an improvement in efficiency of humidifying dry air.

Although the hollow fiber membrane module 1 according to the embodiment of the present disclosure has been described hitherto, the hollow fiber membrane module according to the present disclosure is not limited to the hollow fiber membrane module 1 as described above and includes any aspects included in the concept of the present disclosure and the scope of the claims. Also, each configuration may be appropriately and selectively combined to achieve at least a part of the aforementioned object and advantages. For example, the shape, the material, the arrangement, the size, and the like of each component in the above embodiment can be appropriately changed in accordance with a specific utilization aspect of the present disclosure.

For example, although the bypass pipe 40 is assumed to extend in the radial direction in the hollow fiber membrane module 1, the bypass pipe 40 may be inclined with respect to the radial direction. Specifically, the bypass port 14 may be provided on the side further upstream than the discharge portion 23 in the axis x direction, and the bypass pipe 40 may be provided to be inclined on the downstream side with respect to the radial direction toward the outer periphery side, in the hollow fiber membrane module 1. In addition, the bypass port 14 may be provided on the side further downstream than the discharge portion 23 in the axis x direction, and the bypass pipe 40 may be provided to be inclined on the upstream side with respect to the radial direction toward the outer periphery side, in the hollow fiber membrane module 1. Moreover, two or all of the bypass pipe 40 extending in the radial direction, the bypass pipe 40 provided to be inclined on the downstream side with respect to the radial direction toward the outer periphery side, and the bypass pipe 40 provided to be inclined on the upstream side with respect to the radial direction toward the outer periphery side may be present in a mixed manner.

Figure 7:
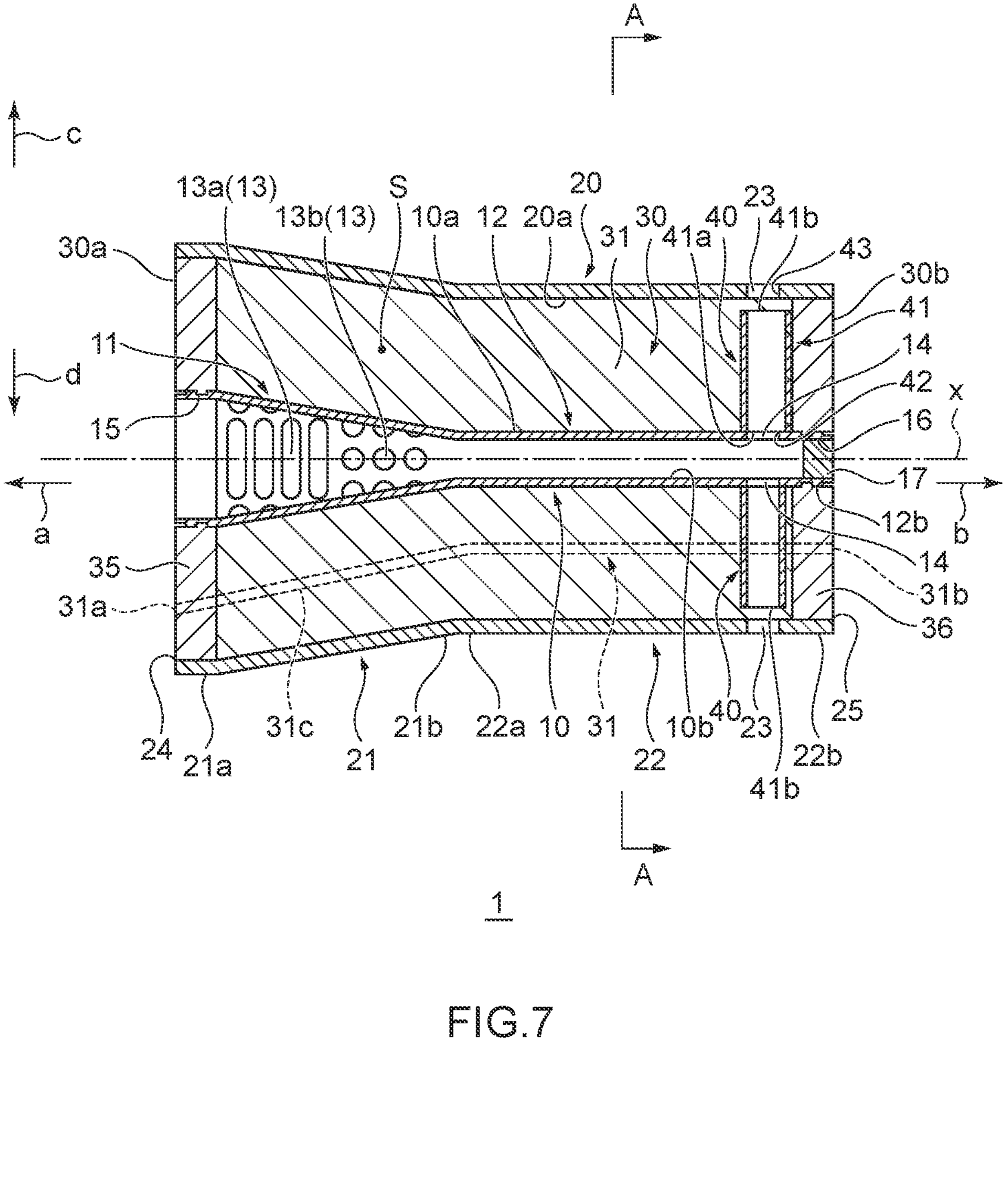
FIG. 7 A sectional view in a section along the extending direction of the hollow fiber membrane module illustrating a modification of a bypass pipe in the hollow fiber membrane module illustrated in FIG. 1.

Also, the bypass pipe 40 may not connect to the outer case 20. As illustrated in FIG. 7, for example, the bypass pipe 40 may be adapted such that the end 41*b* of the bypass pipe 40 does not communicate with the discharge portion 23 of the outer case 20 within a range where the aforementioned third fluid path F3 is formed, is located in the vicinity of the discharge portion 23, and extends to the vicinity of the discharge portion 23 of the outer case 20. Additionally, at least one of the bypass pipes 40 may extend to the vicinity of the discharge portion 23 of the outer case 20, and other bypass pipes 40 may not extend to the vicinity of the discharge portion 23 of the outer case 20. Moreover, the bypass pipes 40 that connect to the outer case 20 and the bypass pipes 40 that do not connect to the outer case 20 may be present in a mixed manner.

In addition, the sealing portion 17 may not be provided at the inner case 10 of the hollow fiber membrane module 1. For example, the tight sealing of the opening 16 or curbing of the gas from flowing out from the opening 16 may be achieved by tapering the downstream end portion 12*b* of the inner case 10 and reducing the opening 16 in size. Also, the tight sealing of the opening 16 or the curbing of the gas from flowing out from the opening 16 may be achieved by causing the downstream end portion 12*b* of the inner case 10 to be deformed and thereby reducing the opening 16 in size or smashing the opening 16, for example. The present disclosure can exhibit the effects and the advantages even in the hollow fiber membrane module 1 that is not provided with the sealing portion 17 in a case where the aforementioned problem has occurred, similarly to the aforementioned case of the hollow fiber membrane module 1 according to the embodiment of the present disclosure. Also, the sealing portion 17 formed of the same material as or a different material from that of the inner case 10 may be fixed to the end of the inner case 10 on the downstream side with an adhesive or through fitting, and the tight sealing of the opening 16 may thus be achieved. Moreover, a bottom portion may be formed integrally with the end of the inner case 10 on the downstream side with no sealing portion 17 attached to the inner case 10 and with no opening 16 formed in the inner case 10. In other words, the sealing portion 17 may be formed integrally with another part of the inner case 10 from a same material.

Also, although the gas is assumed to flow from the downstream side to the upstream side through the first fluid path F1 in the usage state of the hollow fiber membrane module 1, the gas may flow from the upstream side to the downstream side through the first fluid path F1.

Also, although the dry gas is assumed to flow through the first fluid path F1 and the humid gas is assumed to flow through the second and third fluid paths F2 and F3 in the usage state of the hollow fiber membrane module 1, the humid gas may flow through the first fluid path F1, and the dry gas may flow through the second and third fluid paths F2 and F3.

In addition, although the hollow fiber membrane module 1 is assumed to be applied to a humidification module of a humidification device for a fuel cell in the above description, an application target of the hollow fiber membrane module according to the present disclosure is not limited to the humidification module of the humidification device for a fuel cell and is not limited to the fuel cell. Moreover, the application target of the hollow fiber membrane module according to the present disclosure is not limited to the humidification module and may be a dehumidification module of a dehumidification device. The hollow fiber membrane module according to the present disclosure can be applied to any target that can utilize the effects and the advantages.

In addition, although the dry gas is assumed to be the oxidant gas such as oxygen in the reaction gas, and the humid gas is assumed to be oxidant off gas in the off gas after the oxidant gas such as oxygen is used for power generation in the above description, the dry gas may be fuel gas such as hydrogen in the reaction gas, and the humid gas may be fuel off gas in the off gas after the fuel gas such as hydrogen is used for power generation.

The invention claimed is:

1. A hollow fiber membrane module comprising:

an inner case that is a member with a tubular shape;

an outer case that is a member with a tubular shape covering the inner case from an outer periphery side with a space left therebetween;

at least one bypass pipe that connects to the inner case in the space between the inner case and the outer case; and a plurality of hollow fiber membranes that are provided in the space between the inner case and the outer case, wherein the inner case includes an introduction portion that is a part establishing communication between inside of the inner case and outside of the inner case on a side of one end in an extending direction of the inner case and the outer case, the outer case includes a discharge portion that is a part establishing communication between inside of the outer case and outside of the outer case on a side of another end in the extending direction, the inner case includes at least one bypass port penetrating through the inner case between the inside of the inner case and the outside of the inner case on a side closer to the another end in the extending direction than the introduction portion, the bypass pipe communicates with the bypass port and is capable of forming a fluid path that connects the bypass port and the discharge portion, and wherein the bypass pipe connects to the outer case in the space between the inner case and the outer case, communicates with the discharge portion, and connects the bypass port and the discharge portion.

2. The hollow fiber membrane module according to claim 1, wherein the inner case includes one end portion with a tubular shape that is a part on the side of the one end and another end portion with a tubular shape that is a part on the side of the another end and connects to the one end portion on the side of the another end, the introduction portion is provided at the one end portion, the bypass port is provided at the another end portion, the one end portion has a diameter that decreases as it progresses from the side of the one end to the side of the another end in the extending direction, and the another end portion extends along the extending direction.

3. The hollow fiber membrane module according to claim 1, wherein the bypass pipe extends along a direction perpendicularly intersecting the extending direction.

4. The hollow fiber membrane module according to claim 1, wherein the introduction portion includes at least one large introduction port that penetrates through the inner case between the inside of the inner case and the outside of the inner case and includes at least one small introduction port that penetrates through the inner case between the inside of the inner case and the outside of the inner case, an opening area of the large introduction port is larger than an opening area of the small introduction port, and the large introduction port is provided on any side out of the one side and the another side in the extending direction with respect to the small introduction port.

5. The hollow fiber membrane module according to claim 1, comprising:

an inner case sealing portion that is a member tightly closing an opening of the inner case that opens the inside of the inner case on the side of the another end.

6. The hollow fiber membrane module according to claim 1, comprising:

a one-end-side sealing portion that tightly closes an open portion that is opened on the side of the one end of the space between the inner case and the outer case; and an other-end-side sealing portion that tightly closes an open portion that is opened on the side of the another end of the space between the inner case and the outer case, wherein the plurality of hollow fiber membranes extend along the extending direction and penetrate through the one-end-side sealing portion and the other-end-side sealing portion.

* * * * *